June 5, 1951 A. D. SMITH, JR 2,555,711

SIGNAL GENERATOR

Filed July 18, 1946

INVENTOR.
ARCHIBALD D. SMITH JR.
BY Hyman Hurvitz

Patented June 5, 1951

2,555,711

UNITED STATES PATENT OFFICE 2,555,711

SIGNAL GENERATOR

Archibald D. Smith, Jr., Amityville, N. Y., assignor, by direct and mesne assignments, of one-half to United States Television Manufacturing Corporation, New York, N. Y., a corporation of New York, and one-half to Hyman Hurvitz, Washington, D. C.

Application July 18, 1946, Serial No. 684,605

9 Claims. (Cl. 250—36)

This invention relates generally to improvements in signal generators, and particularly to signal generators which are tunable over a wide range of frequencies, and which may be frequency modulated electronically at any frequency in the said range, the extent of frequency modulation being itself adjustable over a considerable range of values and the output over the swept band being at substantially constant amplitude.

It is an object of the present invention to provide an electronic signal generator capable of operation over a wide range of frequencies.

It is a further object of the invention to provide a signal generator which shall be tunable over a frequency spectrum having a high to low frequency value of the order of about 15 to 1, or more, by means of one continuously variable tuning means, and by utilizing only fundamental frequencies of an oscillator, this range being extended upon utilization of harmonics of the of the fundamental frequency.

It is still a further object of the invention to provide a frequency modulated signal generator of the above character.

It is another object of the invention to provide a frequency modulated signal generator of the above character which shall be electronically frequency modulated over an adjustable relatively wide frequency range, and having a relatively constant amplitude over the said range.

It is still another object of the invention to provide an instrument of the above character which shall be stable in respect to frequency drift, and which shall provide a harmonic output of satisfactory character to enable drastic extension of the fundamental frequency range of the instrument.

Another object of the invention resides in the provision of crystal controlled frequency marker signal generators, at two distinct frequencies, and which may be separately or jointly utilized to provide accurate frequency marker signals in the output circuit of the instrument, and which serve accurately to mark off segments of the frequency sweep, and to identify accurately frequencies provided at the output of the instrument.

It is another object of the invention to provide novel frequency sweep circuits, and which shall provide wide frequency sweeps, of substantially linear character.

It is still another object of the invention to provide an instrument of the above character and providing the above features which shall be economical of production, and suitable for production in quantity, which shall be complete and self-contained and which shall be of suitable form factor for maximum commercial utility.

It is a further object of the invention to provide devices for synchronizing the frequency deviations of a frequency modulated oscillator with the sweep of the beam of a cathode-ray indicator, the devices being further adapted for adjusting the relative phasing of the deviations and the sweep.

It is still a further object of the invention to provide devices for converting single ended signal translation circuits to balanced circuits, whereby to facilitate adaptation of my novel signal generator for operation in conjunction with a wide variety of load devices.

The above and still further objects and advantages of my invention will become evident upon study of the following detailed description thereof, when taken in conjunction with the accompanying drawings, wherein.

Figures 1, 2, 3:
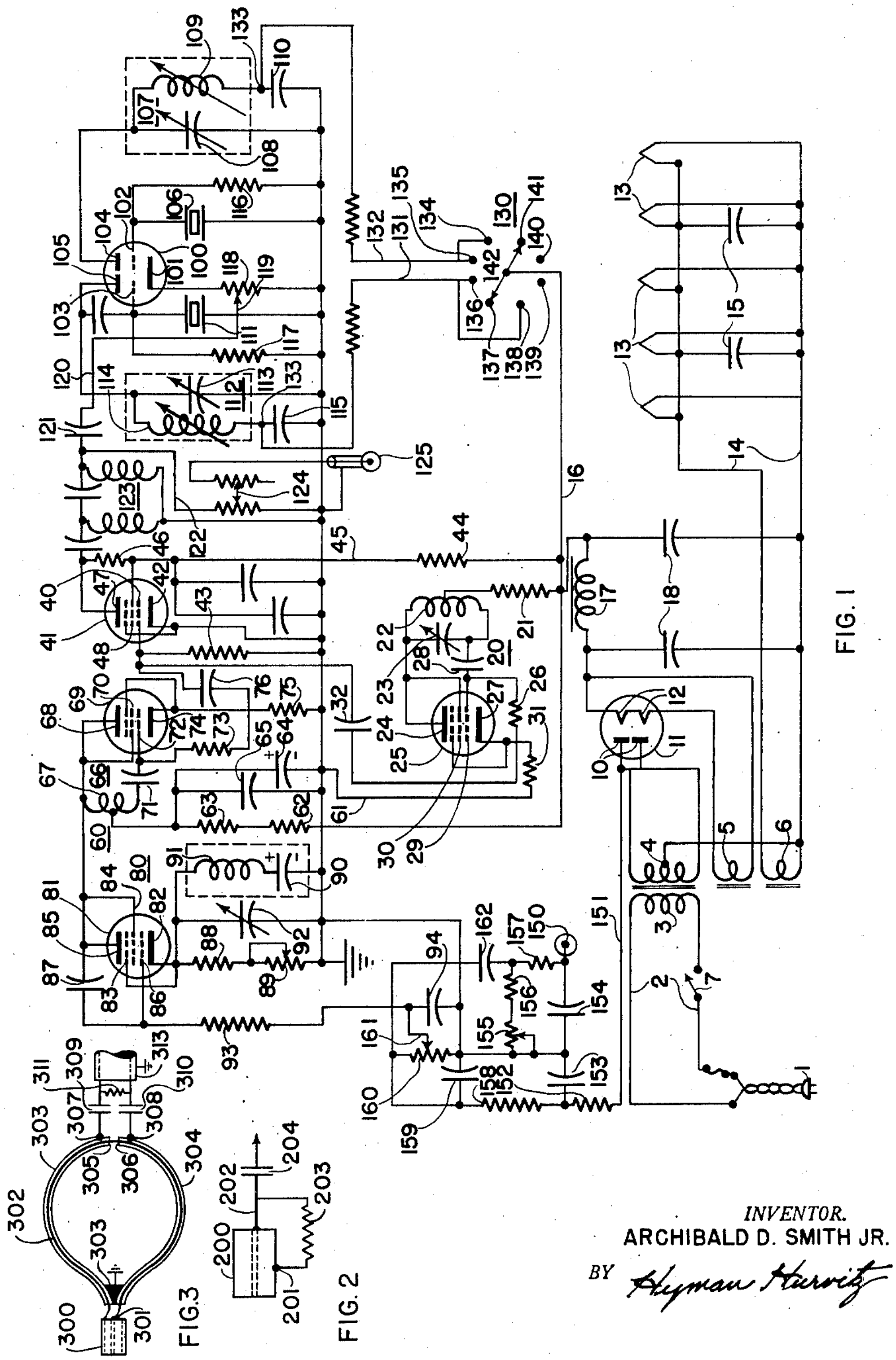
Figure 1 is a schematic circuit diagram of an embodiment of the invention.
Figure 2 is a schematic circuit diagram of a coupling device, having utility in connection with the instrument.
Figure 3 is a schematic circuit diagram of a device for converting from single ended to balanced operation.

In general, my novel signal generator found the inspiration for its development in the need for a single instrument capable of covering the range of frequencies required for operating in the present broadcast, frequency modulation and television spectra, and which was sufficiently flexible, stable and portable for wide application in the above arts. The requirement in respect to frequency sweep for such an instrument involves provision of a sweep or frequency deviation which is adjustable in range from a few kilocycles to many megacycles, in order to enable convenient and rapid analysis of circuits of a wide variety of characters. Such instruments, to find maximum utility, must be tunable over a range of frequencies from at least 500 kc. to above 110 mc. and must furthermore be provided with an output attenuator, and with a frequency sweep providing relatively constant output for adjustable sweep ranges extending from a value of a few kilocycles, and which is suitable for audio circuits, to frequencies of many megacycles, and which is suitable for television and like applications.

In order to avoid output jitter due to mechanical vibration, and which has been found to be present in wide band sweepers utilizing some form of mechanical or electromechanical frequency modulator, resort is had to electronic sweeping, utilizing a reactance tube modulator of novel character, and possessing extremely valuable properties in the type of instrument under consideration.

In order to provide the wide frequency range contemplated, resort is had to a heterodyne method of frequency generation, the required values of frequency being produced by beating the frequency of the modulated oscillator, itself adjusted to have a value above the highest desired fundamental frequency, with the output of an oscillator of adjustable frequency, and the frequency of which extends from that of the modulated oscillator to a value sufficiently great to provide the desired range of frequencies.

A mixer circuit is utilized which provides a limiting action, to establish relatively stable and constant amplitude output signals, the mixer-limiter being arranged to react to but a negligible extent on the tank circuits of the oscillators associated therewith.

In order to provide a suitable sweep rate for the swept oscillator of the instrument I find it most convenient to utilize the power supply frequency as a control signal for the reactance tube modulator, providing a high-pass filter in the output of the limiter circuit, however, to eliminate power supply ripple in the output of the instrument.

In order to provide extremely accurate frequency reference I incorporate in the instrument two crystal marker oscillators, one operating preferably at a frequency of 10 megacycles and the other at 1 megacycle. The marker oscillators may be turned on and off independently or simultaneously and are designed to produce harmonics over the entire output frequency range of the instrument. The amplitudes of the markers are adjustable, and the markers are combined with the instrument output ahead of the output amplitude control, so that the ratio of marker to signal amplitudes may be maintained constant as the output signal amplitude is varied.

The main tuning dial is calibrated in megacycles, with marks at 10 mc. points only, and primary reliance for accurate frequency measurement is placed in the crystal controlled marker signals, the dial reading serving primarily to identify the marker signals. If, for example, the dial reading is near 30 mc. and the 10 mc. marker oscillator is turned on and is found to provide a marker signal adjacent the center of the sweep on a cathode-ray indicator, the marker signal will be identified as exactly 30 mc. The 1 mc. marker may be then turned on to provide frequency marks on either side of the 30 mc. mark.

Proceeding now to a detailed description of the invention, and having reference to the accompanying drawings, and particularly to Figure 1 thereof, the plug 1 represents means for deriving alternating current power for operating the instrument from a commercial source of power. Power is supplied over leads 2, to the primary 3 of a power transformer having a plurality of secondary windings 4, 5 and 6. Connected in series with one of the leads 2 is an on-off switch 7 which may be manually operated to open or close the power circuit.

The secondary coil 4 supplies power in push-pull to the plates 10 of a double diode tube 11, the filaments 12 of which may be energized by the secondary coil 5.

The secondary coil 6 is utilized to supply heating current to the heater filaments of the various tubes utilized in the specific embodiment of my invention being described, the said filaments being collectively designated by the numeral 13, and being connected in parallel across the coil 6, by means of leads 14, which are suitably by-passed by means of condensers 15 connected thereacross.

High tension for the various operating tubes utilized in the practice of my invention may be derived from lead 16 which is connected in circuit with the tube 11 at a point following a filter choke 17, and by-pass electrolytic condensers 18, which are connected in the usual fashion in circuit with the full wave rectifier tube 11, and which serve to provide a relatively smooth unvarying D. C. voltage, for tube operation.

The numeral 20 refers generally to a variable oscillator, capable of being tuned over a wide range of frequencies, and which in one specific application of my invention may be tunable from about 135 mc. to about 255 mc. Operating potential for the oscillator 20 is derived from the lead 16 over a dropping resistor 21 which is connected near the electrical center point of the tuning inductance 22, the latter being shunted by the variable capacitance 23, which serves as a variable tuning element for the oscillator 20. One end of the tank circuit comprised by the inductance 22 and the capacitance 23 is connected directly to the plate 24 of the tube 25, the other end being connected over a condenser 28 and a resistance 26 to the cathode 27, the junction of the condenser 23 and the resistance 26 being connected to a control grid 29. It is the function of condenser 28 and resistance 26 to provide bias for the control grid 29, in accordance with the usual and well known practice. The plate 24 and the control grid 29 being coupled in opposite phase to the tuned circuit comprising coil 22 and condenser 23, are suitably integrated into the circuit 20 for assuring maintenance of oscillations.

There is a point on the coil 22 which is electrically at R. F. ground potential in the sense that no R. F. voltage exists between this point and ground. While the detailed reasons for this condition are difficult of development by reason of the complexity of the circuits involved, it will be clear, in general, that the stated condition must exist, since the plate 24 and the grid 29 are energized at all times by voltages of opposite phase with respect to cathode 27. The line 16 is connected for at least one frequency to the ground-potential point of coil 22 which is referred to above, over an un-bypassed resistance 21 of relatively great magnitude, and since the line 16 is for R. F. signals, at a fixed potential with respect to ground, no R. F. voltage exists across the resistance 21.

The effective A. C. ground point which is established on the coil 22 is not, however, physically fixed since upon variation of tuning of the circuit comprising coil 22 and condenser 23, the potentials and phases of currents and voltages throughout the oscillator 20 likewise vary. The effect in oscillator efficiency of any variation of the effective A. C. ground point on coil 22 is minimized by the presence of resistance 21 in the circuit, since the impedance of that portion of coil 22 which exists between the physical point of connection of resistance 21 thereto and the effective A. C. ground point is effectively in parallel with the relatively high resistance 21, for R. F., and voltages existing in the aforesaid portion of coil 22 set up currents which must flow in the relatively high resistance 21, which minimizes the said currents.

I connect the suppressor grid of tube 25 directly to cathode 27, and screen grid 30 directly to plate 24, the tube 25 operating as a triode, and I derive output signal from the oscillator 20 over an un-bypassed cathode follower resistance 31, the cathode end of which is connected via blocking condenser 32 to control grid 40 of a pentode mixer and limiter tube 41, and the remote end of which is connected to ground.

The oscillator 20 may be tunable over approximately a two to one range of frequencies, and which may extend in one mode of practicing my invention, from 135 to 255 mc. The desired range of output frequencies for the instrument extends from several hundred kilocycles to above 120 megacycles. Transformation of the frequency of the variable oscillator to the desired range may be accomplished by a conversion process, in the pentode mixer and limiter tube 41, the output signal of the oscillator 20 being mixed with that of an oscillator 60 of fixed mid-frequency, and which may be frequency swept by means of a reactance tube oscillator 80. The mid-frequency of the oscillator 60 may be so chosen as to provide upon mixing with the various frequencies of the oscillator 20, the desired output range of frequencies.

Proceeding now to a description of the oscillator 60, plate voltage supply therefor is impressed over a lead 61, and A. C. decoupling resistors 62 and 63, connected in series, the resistors 62 and 63 being by-passed for low frequencies by an electrolytic condenser 64 and for high frequencies by a further condenser 65. Tuning of the oscillator 60 is accomplished by means of a tuned circuit 66 comprising an inductance 67, one end of which is connected to plate 68 of a tube 69, screen grid 70 of tube 69 being likewise connected directly to the plate 68. The other end of inductance 67 is connected via a blocking condenser 71 to a control grid 72 of the tube 69, a leak resistance 73 being connected between grid 72 and cathode 74. Tube 69 is coupled to mixer tube 41 by means of a cathode follower connection comprising an un-bypassed resistance 75 connected between cathode 74 and ground, the high potential end of resistance 75 being coupled to the grid 40 of the tube 41 over a coupling condenser 76.

It will be noted that both oscillator 20 and oscillator 60 are coupled in similar manner, by means of a cathode follower circuit, to the mixer 41, and to the same control grid 40 thereof. The cathode 42 of the tube 41 is connected directly to ground, and the grid 40 to ground over a grid leak 43, mixing being accomplished in the grid circuit of the tube 41. Plate and screen voltage for the tube 41 is impressed from high voltage lead 16 over dropping resistance 44, lead 45, and resistance 46 which interconnects plate 47 and screen grid 48. The voltage to screen 48 and plate 47 is purposely made sufficiently low, and the bias and signals impressed on grid 40 of suitable values, to drive the tube 41 from zero to cut-off, whereby a limiting action takes place in the tube 41. The limiting action is of value in providing constant output signal over the swept range of frequencies. As the output frequency is changed by tuning the variable oscillator 20, the output amplitude remains at nearly constant value, changing to only a slight extent due to change in the gain of the mixer-limiter. The method of deriving oscillator output for mixer 41 from cathode follower circuits increases the frequency stability of the overall operation isolating the oscillator tank circuits and eliminating the possibility of introducing extraneous capacities into the tank circuits.

It will be recalled that the oscillator 60 is required to be frequency modulated, over a band of frequencies of the order of 10 mc. maximum and the frequency deviation being continuously adjustable from a total deviation of but a few kilocycles and up to and beyond the aforementioned value of the order of 10 mc.

Frequency modulation of the oscillator 60 is accomplished by means of a reactance tube modulator 80 utilizing a pentode tube 81 connected to operate as a triode. The tube 81 is preferably of the type known as the 6AK5, and possesses sufficiently high mutual conductance and output capability for the purpose in hand while operating well at the frequencies required. The tube 81 comprises a cathode 82, a suppressor grid 83 connected directly thereto, and a screen grid 84, connected directly to the plate 85. A control grid 86 is coupled over a condenser 87 to the plate 85. It will be clear that the tube 81 operates as a triode, with the connections stated.

Bias for the tube 81 is, of course, provided by the cathode resistance 88 and 89, the latter being adjustable, and the former serving to set a minimum value below which bias may not be reduced by adjustment of variable resistance 89. The resistance 88 also serves to prevent short circuiting of high frequency signals across the variable resistance 89, the latter, by reason of its construction, having a relatively high inherent capacitance to ground.

The principles in accordance with which reactance tubes operate are well understood and need be mentioned but briefly. In general, the plate cathode circuit of the reactance tube is connected across the tuned circuit of an oscillator, and the control grid of the reactance tube is supplied with exciting voltage derived from the alternating voltage existing across the tuned circuit, but 90° out of phase therewith. In such an arrangement the amplified grid voltage acting in the plate circuit of the reactance tube causes a plate current flow therein which is 90° out of phase with the voltage across the oscillator tuned circuit. By reason of the out-of-phase relation of its plate voltage and plate current the reactance tube acts as a shunting reactance for the oscillator tuned circuit, the magnitude of the shunting reactance depending upon the amplification of the tube, which may in turn be controlled by a bias or control voltage.

In the present instance, the plate 85 of the reactance tube 81 is coupled to the grid 86 over a condenser 87 having relatively high reactance to ground at the operating frequency of its associated tube 81, an R. F. circuit to ground being completed over a relatively small resistance 93 and an R. F. by-pass condenser 94. By reason of the high reactance of condenser 87 and the relatively low impedance of resistance 93, the phase of currents flowing to ground over resistance 93 approaches 90° leading with respect to the R. F. voltage on plate 85. The voltage developed across resistance 93 and which serves as driving voltage for the grid 86 is thus established in the proper phase relation with respect to R. F.

plate voltage on the plate 85 to assure efficient operation of the tube 81 as a reactance modulator.

It has been previously stated that the coil 67, which comprises the tuning element, in conjunction with the internal capacitance of tube 69, for the frequency swept oscillator 60, is center tapped and grounded for high frequencies over condensers 64 and 65. This grounding is essential, in order to permit wide frequency deviations in response to the action of the modulator 80, a result which requires that minimum extraneous capacity be shunted across the modulator tube 81, since any such shunting capacity reduces the possible extent of frequency deviation by paralleling the varying effective capacitance of the reactance tube circuit by a fixed value of capacitance. For this reason, the inductance 67 is not provided with a trimmer for adjusting the frequency of the oscillator 60. I provide, instead, a powdered iron tuning slug for the inductance 67, which is designed to have sufficiently high Q at the desired operating frequency, so that the overall operation of the oscillator 60 will not be adversely affected. I tap into the coil 67 at a point which is not centrally located with respect to the physical dimensions of the coil, so that but a portion of the coil inductance is associated with the side of the coil into which the slug enters. Physical adjustment of the slug by movement thereof axially of the coil provides proper tuning, and also provides adjustment of the effective electrical position of the coil center tap, adjusting same to an electrically central location without requiring adjustment of the actual physical tapping position.

By virtue of the grounding for R. F. of the electrically central point in the coil 67 various capacitances which are inherent in the structure of the tube 69 and in the various leads associated therewith are effectively grounded for R. F. and have no effect on the operation of the reactance modulator 80, which is effectively connected only across the plate portion of coil 67. Further, the ratio of inductances in the portions of coil 67 which are connected grid-to-ground and plate-to-ground, respectively, has precisely the value required for optimum operation of the oscillator tube 69, both in respect to efficiency and stability.

The inherent capacity of the modulator tube 81 and of certain circuits associated therewith requires elimination, if optimum operating conditions for the modulator 80 are to be attained, and in order that, insofar as possible, the sole effective capacitance associated with the reactance tube shall be that provided, in effect, by the phase relation of plate current and plate voltage in the tube. To accomplish this objective the resistances 88 and 89, associated with reactance tube 80, are by-passed for power supply frequencies by means of a condenser 90, and provide a small inductance 91 in series with condenser 90, and effectively in series with the tube 81 for R. F. currents. The inductance 91 is intended to resonate with the inherent capacitances associated with the tube 81, whereby the phase relations of plate current with respect to plate voltage in tube 81 are practically unaffected by the said inherent capacitances. Since it is not possible to provide, in the course of quantity manufacture, coils 91 having precisely the proper value, I provide a trimmer condenser 92 connected across the coil 91 and the by-pass condenser 90, and which enables fine adjustment of the effective inductance of the circuit comprising coil 91 and condenser 92, whereby to compensate for variations from optimum in the value of the inductance 91.

Cathode resistors 88 and 89 in series are by-passed for modulating signals and serve to determine the bias or operating point for the tube 81. The resistance 89 is variable and serves as a bias adjustment which permits selection of a linear operating range of tube 81, the resistance 88 serving to set a minimum value of bias which remains effective after resistance 89 has been entirely cut out of circuit.

Modulating signals for the reactance modulator 80 is provided over a lead 151, a dropping resistance 152, a further dropping resistance 158 and a potentiometer 160, to ground, potential at power frequencies being impressed on the grid 86 over the variable tap 161 of potentiometer 160. Condensers 153 and 159 are blocking condensers for power supply frequencies, permitting, however, passage to ground of any hash which may be present in the sweep voltage and assuring that the sweep voltage will be a pure sine wave. Condenser 94 serves to bypass R. F. signals from the tap 161 to ground to prevent development of R. F. signals across the potentiometer 160.

It will be clear, in analyzing the circuits which serve to develop modulating signals for the reactance tube 81, that voltage from line 151 is impressed across resistance 152 and condenser 153, in series, to ground, the voltage existing across condenser 153 being impressed across resistance 158 and condenser 159, in series, to ground. The voltage existing across condenser 159 is then impressed across potentiometer 160. Under these conditions, the modulating voltage as applied to the grid 86 is not in phase with the voltage in the lead 151, two phase shifts having taken place between lead 151 and grid 86.

Since it is essential that the sweep producing potential derivable at terminal 150, where applied to a cathode-ray indicator or oscilloscope (not shown), be approximately in phase with the modulating voltage, I shunt the resistance 160 over a condenser 162 and a pair of series connected resistances 155 and 156 to ground, the latter being in turn paralleled by a resistance 157 in series with a condenser 154 to ground. The successive phase shifts introduced by the capacitance 162, and the resistances 156 and 155, and by the resistance 157 and the capacitance 154 are such as to compensate at least approximately for the phase shifts introduced between lead 151 and grid 86 of tube 81. Further, by virtue of the variable character of the resistance 155, the phase of the voltage introduced into the indicator over lead 150, may be varied over a range of values, which enables shift of patterns across the face of the indicator. The resistance 156, in series with the variable resistance 155 serves to prevent shorting of the condensers 154 for zero setting of the resistance 155, and further, establishes a limiting value for the phase shift producible by adjustment of variable resistance 155.

Marker signals at accurately determinable values are provided by means of a pair of crystal controlled oscillators comprising a double triode tube 100, and having a cathode 101, grids 102, 103 and plates 104, 105. Each of the triodes comprised in the tube 100 is associated with one of the crystals, which are cut to be harmonically related, and which may be at any desired values. I prefer to utilize frequencies of 1 and 10 mc., respectively, as was previously explained, but for reasons of convenience only.

I connect one of the crystals, 106, from grid 102 to ground, and the other of the crystals from grid 103 to ground, connecting in the plate 104 associated with the grid 102 a tuned circuit 107 comprising a tunable condenser 108 and a tunable inductance 109 connected in parallel, the inductance 109 being connected in series, however, with a blocking condenser 110. The other of the crystals 111 is connected from grid 103 to ground, and in the associated plate circuit is a tuned circuit 112 comprising a parallel connected condenser 113 and inductance 114, the latter being in series with a blocking condenser 115.

Each of the crystals 106 and 111 is paralleled by a suitable grid leak, identified by numerals 116 and 117, respectively. The double triode 100 is provided with a cathode follower output circuit comprising an un-bypassed resistance 118, from which may be derived output signals at the frequency of each of the crystals 106 and 111 as well as at harmonics of each of such frequencies, by means of a variable tap 119, which serves thereby as a joint output control for the crystal oscillators.

The outputs of the crystal oscillators are applied over lead 120 and coupling condenser 121 to an output lead 122 which couples to a co-axial output plug 125, in a manner to be explained. The value of the condenser 121 is chosen sufficiently small to have no material effect on the high frequency output termination of the generator, while permitting injection of a desirable magnitude of marker signal.

The output of the mixer tube 41 is also applied to the output lead 22 over a high pass filter, denominated generally by the numeral 123, and which may be of any conventional design suitable for passing the relatively high frequency output of the mixer tube 41 but blocking the power supply frequencies which might otherwise be impressed on the output terminal 125 and introduce power supply ripple into the cathode-ray oscilloscope.

Connected in the lead 122 is an output control potentiometer which serves to control simultaneously the output level of the sweep signal, which is derived from the mixer tube 41, and the output of the marker generator tube 100, so that all signal outputs may be adjusted by means of a single control. Adjustment of the relative values of swept signal and marker signal may be accomplished by adjustment of the tap 119.

Plate voltage for the separate sections of the double triode 100 may be applied over a selector switch 130, separate plate voltage leads 131 and 132, respectively, being connected in circuit to the tube sections at points 133 intermediate the coil 109 and the blocking condenser 110, and intermediate the coil 114 and the blocking condenser 110.

The switch 130 is of rotary character having eight stationary contacts 134—141, inclusive, and a double contact rotor 142, adapted to contact simultaneously and selectively diametrically opposite ones of the stationary contacts.

In the illustrated position of the rotor, power from lead 16 is not applied. Rotating the rotor 142 one step clockwise from the illustrated position impresses voltage on the plate 105 only of the marker generator over contact 136, a further step coupling the plate 104 only into the power circuit, over contact 135. Contact 134 and contact 138 are diametrically opposing, and being respectively connected to plates 104 and 105, a further clockwise step of rotor 142 results in the application of operating plate voltage to both marker oscillators. The next step of clockwise rotation brings the switch arm back to "off" position.

Signal output from the instrument which forms the subject matter of the present application is derived over a co-axial cable, as has been previously indicated. The outer conductor of the cable is solidly grounded, and the inner conductor connected to the outputs of mixer tube 41 and of the marker signal oscillator tube 100 over lead 122 and attenuator 124.

Since the instrument may be required to operate into a single ended load, or into a balanced load, I provide auxiliary networks for use with the instrument and which serve to terminate same in a manner suitable for accomplishment of the above ends.

Referring now to Figure 2 of the drawings, the numeral 200 identifies a co-axial connector suitable for connection to connector 125 (Figure 1). When connected in circuit the outer shell of the connector 200 is grounded, the inner conductor being supplied with R. F. signals. Connected between a convenient point 201 on the connector 200, and a point on the inner conductor 202 is a terminating resistance 203, preferably having a value of about 100 ohms. The output of the instrument then is developed across the resistance 203, the ungrounded end of which may be connected over a coupling condenser 204 to any desired load.

For connecting the single ended output of the generator into a balanced circuit I provide a co-axial connector which is represented schematically in Figure 3 by the numeral 300, and the outer shell of which is grounded when connected to the connector 125 (Figure 1). The inner conductor 301 is connected to a loop 302 of insulation covered conductor, which describes an arcuate or re-entrant path of relatively small dimensions returning to the grounded outer shell of the plug 200. The described path may be roughly circular in character, if desired, although the precise shape and size of path is not a critical factor in the design of the device, nor is it essential that the return end of the loop be grounded to the shell of the plug, other convenient ground points being found to be equally satisfactory.

The loop 302 is surrounded over a major portion of its length by a pair of hollow conductors 303 and 304, which may be constructed of copper tubing, and which are joined at one end thereof as by a shorting element 303, which is grounded.

The hollow conductors 303, 304 are cut and bent in the same jig to assure exactly duplicate construction, and when assembled in the circuit the ends 305, 306 are left separated by a slight amount. R. F. currents, flowing in the conductor 302, induce corresponding currents in the interior walls of the hollow conductors 303, 304, which causes R. F. voltage to appear across the end points 305, 306. By reason of the symmetry of construction of the loop segments consisting of the conductors 303, 304 the R. F. voltage available at loop terminations 305 and 306 are of precisely opposing phase, the voltage separation of point 305 with respect to ground being equal in magnitude and opposite in phase to that of the point 306.

Out of phase potentials available at the end points 305 and 306 may be made available by connections to the respective loop segments at any convenient points which are equally spaced respectively from the loop ends 305, 306. However, I prefer to derive such potentials from points 307, 308 adjacent the said loop ends, duplicate coupling condensers 309, 310 being provided which have reactances of high value with respect to the terminating resistance 311. The center point of resistance 311 may be grounded, if desired, although this is not essential to the operation of the circuit, the ends of resistance 311 being connected to a two conductor cable, generally identified by the numeral 313, and which is provided with a grounded shield. The resistance of element 311 is chosen to match the surge impedance of the cable, and the effect of mismatch of resistance 311 is avoided by means of the condensers 309, 310, which are connected in series with resistance 311 and which are of high impedance at the frequencies under consideration. The effect of the high impedance of condensers 309, 310 relative to the impedance values of resistance 311 is to provide current flow in resistance 311 which is substantially unaffected by variations in the values of the resistance, or by the values of various distributed capacities which may be inherent in a physical embodiment of the device.

While I have illustrated the circuit device of Figure 3 as utilizing condensers 309, 310, I wish it to be understood that any high impedance circuit element, or combination thereof, may be found satisfactory for inclusion in the circuit in place of condensers 309, 310.

While I have described one specific embodiment of my invention, it should be understood that variations in circuit arrangements in the combination of elements of the device and in the construction of such elements may be resorted to without departing from the spirit of the invention, which is defined in the appended claims.

What I claim and desire to secure by Letters Patent of the United States is:

1. In a frequency swept oscillation generating circuit an oscillating circuit comprising an inductance, a first vacuum tube having a plate and a grid, means coupling said inductance between said plate and said grid, means grounding the electrical center point of said inductance for oscillation frequencies, a reactance tube modulator for said oscillating circuit comprising a second vacuum tube having a plate connected to said plate of said first vacuum tube and having a cathode circuit, and means for balancing out the inherent capacitive reactance associated with the cathode circuit of said reactance tube modulator.

2. A combination in accordance with claim 1 wherein said means for balancing out comprises an inductance for resonating with the said inherent capacitive reactance.

3. A frequency swept oscillation generator comprising means for generating a frequency modulated signal, a single ended output circuit for said signal, means for transforming said single ended output to a balanced output, and comprising a pair of substantially identical hollow tubular members, means for grounding an end of each of said members, the ungrounded ends of said members being arranged in separated proximity, a conductive member looped through said members and connected across said single ended output, and means for deriving balanced signals from said members.

4. A frequency swept oscillation generator comprising means for generating signals over a relatively wide band of frequencies, means for generating at least one marking signal, an output terminal, means for applying said marking signal and said frequencies in single ended relation to said output terminal, and means for translating signals derived from said output terminal to further output signals bearing a balanced double ended relation.

5. A signal generator for application with an oscilloscope comprising an oscillator, a reactance tube modulator for causing variations of frequency of said oscillator, an alternating current power source for said oscillator, means for applying signals derived from said power source for controlling said reactance tube modulator, means for applying signals derived from said power source for providing a sweep voltage for said oscilloscope, and a network having adjustable resistances for adjusting the relative amplitudes and phases of said controlling signals and said sweep voltage.

6. In a signal generator, a pair of vacuum tubes, means coupled to one of said tubes for producing oscillations at one frequency, means coupled to the other of said tubes for producing oscillations at another frequency, a common cathode resistor for said tubes, and means for deriving signals selectively at said one frequency and at said another frequency from said cathode resistor.

7. In a signal generator, a pair of vacuum tubes, means coupled to one of said tubes for producing oscillations at one frequency, means coupled to the other of said tubes for producing oscillations at another frequency, a common cathode resistor for said tubes, and means for deriving signals at both said frequencies simultaneously from said cathode resistor.

8. In a signal generator, an oscillator comprising a vacuum tube having at least a plate and a grid, a tuning impedance coupling said plate and said grid, means for grounding said impedance for oscillator frequency at a point electrically neutral with respect to ground, means for adjusting said point by electrical modification of said inductance and means for coupling a reactance modulator tube to said plate.

9. The combination in accordance with claim 8 wherein said modulator tube comprises at least a plate, and wherein said means for coupling is a direct connection between said plate of said modulator tube and said plate of said vacuum tube.

ARCHIBALD D. SMITH, Jr.

REFERENCES CITED

The following references are of record in the file of this patent:

UNITED STATES PATENTS

| Number | Name | Date |
|---|---|---|
| 1,876,555 | Bock | Sept. 13, 1932 |
| 1,993,395 | Beers | Mar. 5, 1935 |
| 2,111,567 | Lowell | Mar. 22, 1938 |
| 2,196,675 | Gutzmann | Apr. 9, 1940 |
| 2,252,458 | Conklin et al. | Aug. 12, 1941 |
| 2,252,613 | Bingley | Aug. 12, 1941 |
| 2,265,016 | White | Dec. 2, 1941 |
| 2,289,670 | McClellan | July 14, 1942 |
| 2,393,971 | Busignies | Feb. 5, 1946 |
| 2,398,050 | Schreiner | Apr. 9, 1946 |
| 2,408,684 | Roberts | Oct. 1, 1946 |
| 2,417,895 | Wheeler | Mar. 25, 1947 |
| 2,458,760 | Andersen | Jan. 11, 1949 |
| 2,494,321 | Usselman | Jan. 10, 1950 |